United States Patent
Janakiraman et al.

(10) Patent No.: US 9,590,906 B2
(45) Date of Patent: Mar. 7, 2017

(54) NETWORK RESOURCE SHARING FOR ROUTING AND FORWARDING INFORMATION

(71) Applicant: CISCO TECHNOLOGY, INC., San Jose, CA (US)

(72) Inventors: Rajagopalan Janakiraman, Cupertino, CA (US); Pagalavan Krishnamoorthy, San Jose, CA (US); Peter Geoffrey Jones, Campbell, CA (US); Sridhar Subramanian, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 14/495,186

(22) Filed: Sep. 24, 2014

(65) Prior Publication Data

US 2016/0087892 A1  Mar. 24, 2016

(51) Int. Cl.
*H04L 12/741* (2013.01)
*H04L 29/12* (2006.01)

(52) U.S. Cl.
CPC .......... *H04L 45/745* (2013.01); *H04L 61/103* (2013.01); *H04L 61/2015* (2013.01)

(58) Field of Classification Search
CPC ....... H04L 45/745; H04L 45/02; H04L 45/54; H04L 45/58; H04L 45/74; H04L 61/20; H04L 12/4633
See application file for complete search history.

(56) References Cited

U.S. PATENT DOCUMENTS

| | | |
|---|---|---|
| 2012/0033541 A1 | 2/2012 | Jacob Da Silva et al. |
| 2012/0128004 A1* | 5/2012 | Aybay ................. G06F 13/4022 370/401 |
| 2012/0155467 A1* | 6/2012 | Appenzeller .......... H04L 45/54 370/392 |
| 2013/0242718 A1 | 9/2013 | Zhang |

OTHER PUBLICATIONS

International Search Report and Written Opinion in corresponding PCT application PCT/US2015/051812, mailed Dec. 18, 2015.

* cited by examiner

*Primary Examiner* — Curtis A Alia
(74) *Attorney, Agent, or Firm* — Meunier Carlin & Curfman LLC (57) ABSTRACT

A system, computer-readable media, and methods for network resource sharing of routing and forwarding information are disclosed. The method may include receiving a first address for a device connected to a network and receiving one or more second addresses for the device. The method may also include identifying a first switch through which the device connects to the network and identifying a second switch for storing the first address and the one or more second addresses. Further, the method may include storing the first address in the first switch and storing the first address and the one or more second addresses in the second switch.

20 Claims, 5 Drawing Sheets

NETWORK RESOURCE SHARING FOR ROUTING AND FORWARDING INFORMATION

TECHNICAL FIELD

The present disclosure relates generally to network resource sharing for storing routing and forwarding information.

BACKGROUND

The number of devices that connect to a particular network historically could be predicted with relative certainty. Many corporate networks used to include only wired access connections and limited support for additional wireless connections. As a result, the number of potential connections could be established by counting the number of physical wired access ports and accounting for a small number of wireless connections. Accurately predicting the number of potential connections is an important consideration for network topology design. For example, network switches store routing information and forwarding tables for devices within a network. The routing information and forwarding tables may be stored in specialized memory, such as ternary content-addressable memory. As the number of devices connected to a network increases, additional memory is required to store the routing information and forwarding information.

The introduction of wireless devices to networks has made predicting the amount of routing and forwarding information to be stored more difficult. Many companies now allow employees to bring their own devices to work. For example, a user may bring a laptop, a tablet, a smart phone for work use, and a smart phone for personal use. Simply counting the number of physical wired access points no longer serves as an accurate predictor of the number of devices that will connect to a network.

Network routing information traditionally included, for example, media access control (MAC) addresses and internet protocol (IP) addresses. With the introduction of IPv6, a single device may have multiple IP addresses. As a result, the combination of wireless connections and multiple IP addresses per device provides large fluctuations in the number of network connections within a network at any given time. For example, a company may host a conference in a conference room with five hundred wired access points. However, each person may arrive with three wireless devices, creating a demand for a short period of time of an additional fifteen hundred connections. Companies want to provide sufficient network capacity while minimizing the costs associated with a designing a network infrastructure to handle large volumes of additional connections.

The present disclosure scales forwarding resources, including network routing information and forwarding tables, across network devices to overcome one or more problems discussed above, among others.

BRIEF DESCRIPTION OF THE DRAWINGS

Like reference numbers and designations in the various drawings indicate like elements.

DESCRIPTION OF EXAMPLE EMBODIMENTS

Overview

In accordance with one aspect, the present disclosure is directed to a system, computer-readable media, and methods for network resource sharing of routing and forwarding information. The method may include receiving a first address for a device connected to a network and receiving one or more second addresses for the device. The method may also include identifying a first switch through which the device connects to the network and identifying a second switch for storing the first address and the one or more second addresses. Further, the method may include storing the first address in the first switch and storing the first address and the one or more second addresses in the second switch.

The disclosure also relates to a system including, for example, a first switch configured to store a first address for a device connecting to a network through the first switch, and a second switch configured to store one or more second addresses for the device. The system may also include a connection between the first switch and the second switch configured to transmit packets destined to the device from the second switch to the first switch based on the one or more second addresses.

Further, the disclosure relates to a computer-readable medium comprising instructions which, when executed by a processor, perform a method comprising receiving a first address for a device connected to a network and receiving one or more second addresses for the device. The computer-readable medium may also include instructions that identify a first switch through which the device connects to the network and identify a second switch for storing the first address and the one or more second addresses. Further, the computer-readable medium may include instructions that store the first address in the first switch; and store the first address and the one or more second addresses in the second switch.

Example Embodiments

Figure 1:
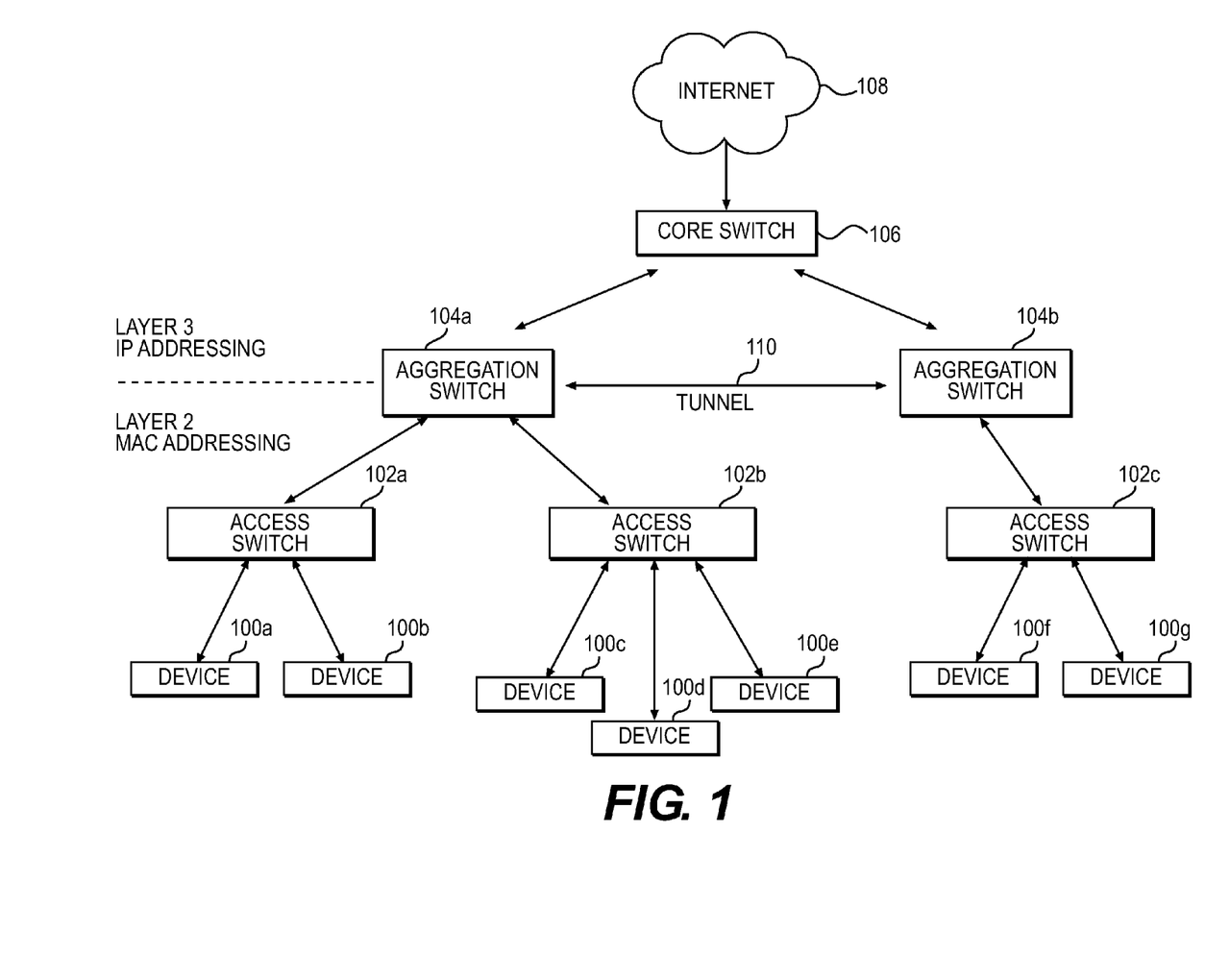
FIG. 1 illustrates a system diagram of an example network environment.

FIG. 1 illustrates a system diagram of an example network environment including three tiers of network switches: access switches 102*a-c*, aggregation switches 104*a-b*, and core switch 106. As illustrated, a plurality of devices 100*a-g* may connect to a network using access switches 102*a-c*. The devices 100*a-g* may be, for example, a laptop, a personal computer, a printer, a server, or a smart phone. The devices 100*a-g* may connect to access switches 102*a-c* using wired or wireless connections.

The access switches 102*a-c* may serve devices and deliver packets to and from the devices. The access switches 102*a-n* may include wired ports, such as a wired Ethernet connection, and wireless connections for devices 100*a-g*. The access switches 102*a-c* may therefore serve as an entry point into a network for a device. By way of example, a corporate environment may include a plurality of access switches covering different areas of a particular floor in a building. The access switches 102*a-c* may route data and store the MAC address of connected devices.

Multiple access switches 102*a-c* may connect to aggregation switches 104*a-b*. In the example of FIG. 1, the access switches 102a and 102b may connect to aggregation switch 104a, while access switch 102c may connect to aggregation switch 104b. Aggregation switches 104a-b may have a higher capacity than access switches 102a-c. For example, a single aggregation switch may serve a floor of a corporation and aggregate the communications of access switches on that floor.

The access switches may connect to aggregation switches 104a-b, which may provide dual-mode routing. Packets transmitted below aggregation switches 104a-b in the topology may be routed based on, for example, layer two MAC addresses. Packets transmitted above aggregation switches 104a-b may use layer three IP addressing. As a result, aggregation switches 104a-b may translate and route messages based on both MAC addressing and IP addressing. Core switch 106 may, in one exemplary embodiment, use layer three IP addressing, and access switches 102a-c may use layer 2 MAC addressing.

Aggregation switches 104a-b may store the state for all devices connected underneath it in the network topology. With reference to FIG. 1, for example, aggregation switch 104a may store MAC and associated IP address entries for devices 100a-e. Some of devices 100a-e may have, for example, one IPv4 address and one or more IPv6 addresses, only an IPv4 address, IPv6 addresses, or other addressing schemes. While the disclosure provides an example relating to MAC addressing and IP addresses, it will be appreciated that other forms of network routing information may be used consistent with the disclosed embodiments.

Core switch 106 may provide routing between aggregation switches 104a-b and also may serve as a gateway access point from the network to the internet 108, another wide area network, or another portion of the network served by one or more additional core switches 106. The core switch 106 may route packets based on layer three IP addressing and may store IP addresses or pools of IP addresses. For example, the core switch 106 may route incoming packets to an aggregation switch that is responsible for a pool of IP addresses, and the aggregation switch may then locate the particular device using an IP lookup table. While a single core switch 106 has been illustrated, a network may include multiple core switches connected together.

Two examples of a network communication will now be described. The first example of network communication involves transmitting a packet between two network devices 100a-g, and the second involves transmitting a packet from one device 100a-g to the internet 108. A packet sent from device 100a to device 100b may be routed through access switch 102a using MAC addressing. Transmissions from device 100a to the internet may use a combination of MAC addressing and IP addressing. The packet may initially be routed to access switch 102a and then aggregation switch 104a using MAC addressing. The aggregation switch 104a may forward the packet based on IP addressing to the core switch 106 and internet 108. As a result, aggregation switches 104a-b may store routing and forwarding information that includes the MAC addresses and associated IP addresses. The forwarding information and routing tables may be stored in, for example, ternary content addressable memory or hash tables.

The network illustrated in FIG. 1 may be designed with a number of access switches 102a-c, aggregation switches 104a-b, and core switch(es) 106 that are appropriate for the predicted number of devices that will connect. While illustrated as separate network components, it will be appreciated that the access switches, aggregation switches, and/or core switches may be combined into one or more network devices.

Devices 100a-g may include mobile devices that will come and go from a network. In one example, a large conference room includes several access switches served by a single aggregation switch. The conference room may be largely unused most of the time, resulting in wasted network resources. However, when a conference occurs, users may each bring multiple devices, placing a large demand on network connectivity resources in the conference room. Purchasing an aggregation switch of sufficient capacity to handle a large demand from many devices increases the cost of the network. If, for example, one thousand devices enter a conference room, the aggregation switch serving that conference room would need sufficient memory to store the associated MAC and IP addresses for all one thousand devices. Some of these IP addresses may include IPv6 addresses, which may require more than one forwarding entry. Devices may also have multiple IPv6 addresses associated with a single MAC address. For example, a smart phone may allow each application to have its own IPv6 address, resulting in multiple entries in network forwarding tables per device. As a result, the number of forwarding entries that need to be stored by an aggregation switch 104a-b may increase rapidly in a short period of time.

In one exemplary embodiment, storing only a MAC address for a connected device considerably reduces the amount of memory required for an aggregation switch. Similarly, storing a MAC address and fewer than all of the IP addresses for a device reduces the amount of memory used by an aggregation switch. Accordingly, embodiments of the disclosure provide a tunnel 110 between aggregation switches. An aggregation switch that nears its capacity for memory storage may transfer IP addresses to another aggregation switch that has additional capacity. In addition, forwarding and routing tables may reflect that a device that normally would be served by a particular aggregation switch will instead be served by an aggregation switch with additional capacity.

For example, aggregation switch 104a may have already filled its memory to a predefined capacity, such as eighty percent. When device 100a access the network, its MAC address and IP addresses typically would be stored in aggregation switch 104a. However, because aggregation switch 104a is already at a predefined capacity, aggregation switch 104a may store only the MAC address for device 100a, or the MAC address and a reduced number of IP addresses for device 100a. Aggregation switch 104b, which may have additional capacity in this example, may store the MAC address for device 100a along with the IP addresses or IP addresses not stored by aggregation switch 104a. The memory load for servicing new devices coming online may therefore be balanced across multiple aggregation switches. This allows an aggregation switch 104a servicing a high volume of users, such as when a conference occurs in a large conference room, to share its load with other aggregation switches. As a result, the network topology need not include a very expensive aggregation switch 104a that will primarily be underutilized except for occasional bursts of high usage. Instead, the network topology can adapt to changing conditions to share the memory load of storing routing and forwarding tables across multiple aggregation switches.

Aggregation switches 104a-b may share the load of storing routing and forwarding tables by using tunnel 110. Tunnel 110 may be, for example, a layer two tunnel based on MAC addresses. The tunnel may be used when routing and forwarding information has been stored in a different aggregation switch due to increased network load on an aggregation switch. Continuing with the example above, device 100a may access the network through access switch 102a. Aggregation switch 104a may be responsible for devices connecting through access switch 102a, but may experience a high load. Therefore, aggregation switch 104a may store, for example, the MAC address of device 100a, and a tunnel 110 may be employed between aggregation switch 104a and 104b.

Aggregation switch 104b may store the MAC address along with the IP addresses for device 100a. When device 100a sends packets intended for the internet requiring IP addressing, aggregation switch 104a may forward the packet through tunnel 110 to aggregation switch 104b. Aggregation switch 104b may then lookup and use the IP addresses of device 100a for outbound network transmission. Similarly, incoming traffic may be routed to aggregation switch 104b, which stores the IP addresses, and aggregation switch 104b may look up the corresponding MAC address for device 100a, forward the packet through tunnel 110 to aggregation switch 104a, and aggregation switch 104a may forward the packet to device 100a based on its MAC address. The foregoing description provides an exemplary embodiment for distributing the memory storage requirements of aggregation switches based on a predefined capacity. Additional embodiments and details will be described below. In one exemplary embodiment, IP addresses for a given device may be distributed across other aggregation switches that utilize the same core switch 106.

While FIG. 1 illustrates a single connection to each network component for simplicity, it will be appreciated that the network may include multiple connections per component. For example, aggregation switch 104b may connect not only with access switch 102c, but also with access switches 102a and/or 102b. Similarly, devices 100a-g may connect to multiple access switches. This may occur when as a user travels throughout a building, providing mobility within a network where consistent addressing may remain to ensure seamless network connectivity. Further, the number of illustrated devices is exemplary in nature as different numbers of network components may be used for networks of different sizes and complexity.

Figure 2:
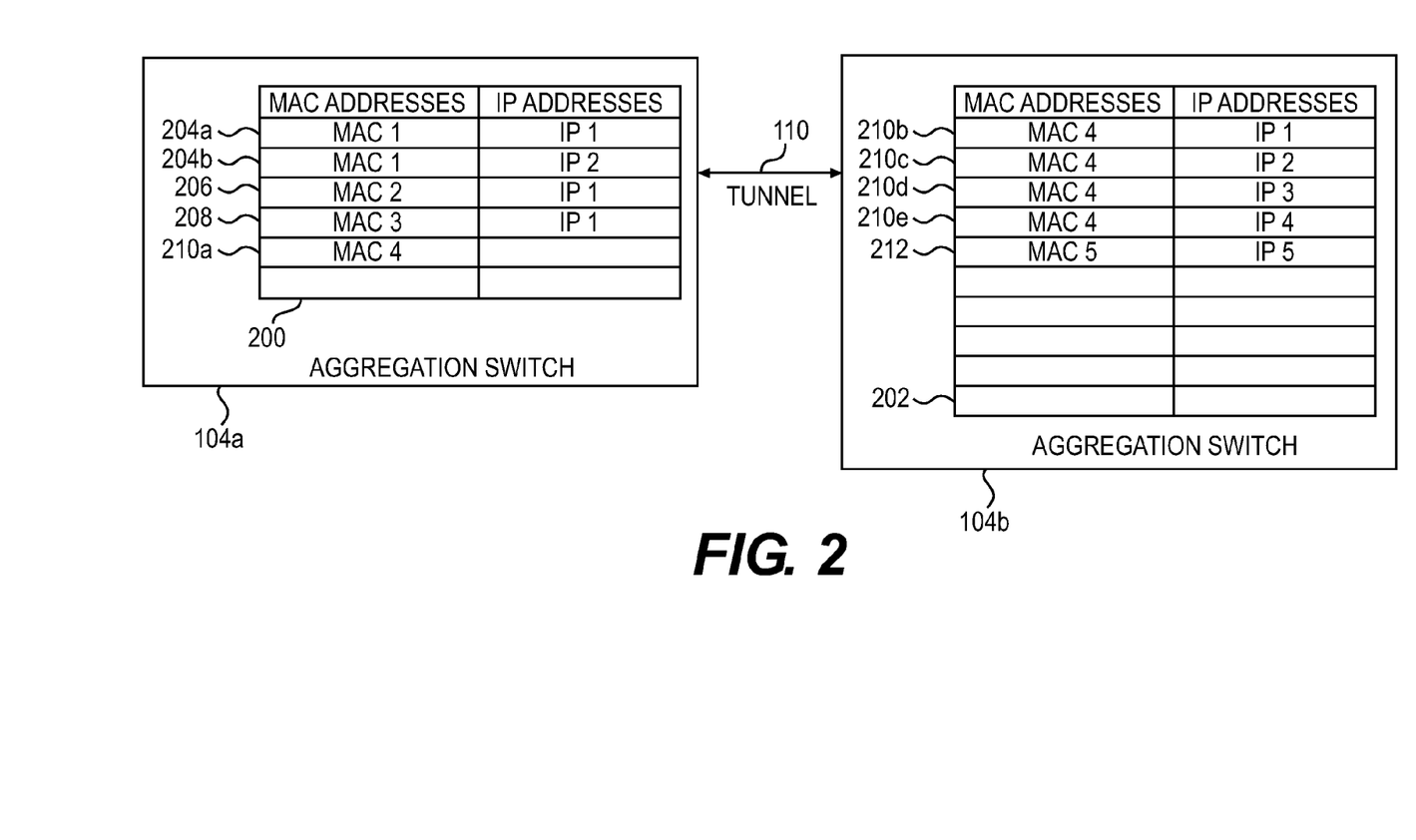
FIG. 2 illustrates a system diagram of exemplary aggregations switches connected using a tunnel.

FIG. 2 illustrates an exemplary embodiment of two aggregation switches 104a and 104b that share the memory load of storing routing and forwarding information. In this exemplary embodiment, aggregation switch 104b may be lightly loaded and have additional memory capacity for storing routing and forwarding information. Routing and forwarding information tables 200, 202 may store, for example, MAC addresses and IP addresses, including IPv4 and IPv6 addresses. The routing and forwarding information tables 200, 202 may be stored in any type of memory, such as ternary content addressable memory.

Routing and forwarding information table 200 in aggregation switch 104a may be approaching its capacity. As a result, aggregation switch 104a may store, for example, the MAC address for a connected device, and the MAC address along with IPv4 and/or IPv6 addresses may be offloaded to aggregation switch 104b. Networks may include aggregation switches of varying capacities. The number of entries shown in table 200 is exemplary in nature as aggregation switches may store many more address entries.

As illustrated, aggregation switch 104a may store two IP addresses that are associated with a first MAC address at entries 204a and 204b. The MAC address need not be stored twice at both entries 204a, 204b, but instead multiple IP addresses may be associated with a single entry of a MAC address in memory. Entries 206 and 208 show examples of devices that have connected to the network and been assigned a single IP address. When the device associated with MAC address 4 joins the network, the network may determine that aggregation switch 104a is approaching its capacity and has only a limited number of memory addresses.

As a result, the MAC address entry 204a may be stored without any IP addresses on aggregation switch 104a, and tunnel 110 may be used to offload storage of the associated IP addresses for MAC address 4 to aggregation switch 104b. The MAC address 4 may have four entries at 210b-e for separate IP addresses. For example, the device having MAC address 4 may use IPv6 addressing and have four entries. The memory for storing table 202 may not actually store the MAC address 4 at four separate entries 210b-e, but instead the MAC address may be stored once along with the four associated IP addresses to reduce memory redundancy. MAC address 4 is shown at each of entries 210b-e for illustrative purposes. In addition, aggregation switch 104b may store additional MAC address and IP addresses as illustrated by exemplary entry 212.

Routing and forwarding information table 202 therefore may store a MAC address and one or more IP addresses for entries that do not fall directly under its network hierarchy. Tunnel 110 allows the load of storing IP addresses to be distributed across multiple aggregation switches to distribute the load throughout a network. This may allow an aggregation switch, such as aggregation switch 104b, to store routing and forwarding information and handle level three address lookup of packets instead of an overloaded aggregation switch.

While the example in FIG. 2 illustrates memory load sharing between two aggregation switches, three or more aggregation switches may also be used to further share the load. For example, as the memory in aggregation switch 104b becomes full, it may rely on a further aggregation switch to store IP addresses associated with MAC addresses stored by aggregation switch 104a or aggregation switch 104b. In addition, as memory in aggregation switch 104a fills, IP addresses associated with MAC addresses stored by aggregation switch 104a may be stored in multiple aggregation switches using multiple tunnels 110.

While tunnel 110 has been described with reference to sharing the memory load of storing IP addresses, tunnel 110 may also be used for sharing other network resources. For example, a network administrator may choose to purchase aggregation switches that support different features, where aggregation switches that offer enhanced features come at a higher cost. By employing tunnel 110, enhanced features may be implemented by aggregation switches that offer those features. Enhanced features may include, for example, multiprotocol label switching (MPLS), virtual pseudowire based label switching (VPLS), granular network visibility through larger netflow tables, quality of service features, deep back inspection (NBAR), and others, that may be implemented, for example, in certain classes of aggregation switches.

Figure 3:
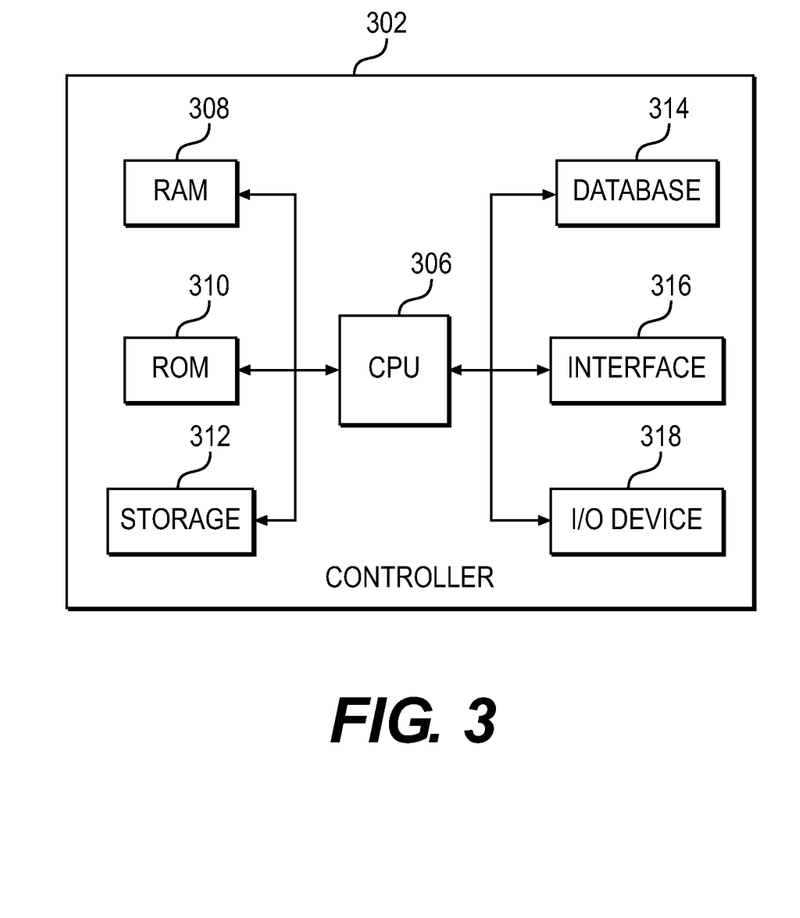
FIG. 3 illustrates a system diagram of an exemplary controller.

FIG. 3 illustrates a system diagram of a computer serving as a controller 302. The system components illustrated in FIG. 3 may be included in the network components of the system, such as core switch 106, aggregation switches 104a-b, access switches 102a-c, or a separate server. Controller 302 may be, for example, an enterprise controller that maintains a view of the network topology. Controller 302 may be part of core switch 106, located on a separate server within the network or connected to the network 108, part of a DHCP server, or distributed across multiple network components, such as aggregation switches 104*a-b*. In addition, multiple controllers may be used within a network to monitor the network topology and connections. The controller may also be software executing on a network component, such as core switch 106 or a separate server.

In the example of controller 302 being an enterprise controller, controller 302 may be responsible for knowing the topology of which switches are active and connected in a network at any given time. Switches may come offline and online as network loads vary. For example, a stub aggregation switch may be provided that remains offline and does not directly serve any access switches. The stub aggregation switch may be brought online to store MAC addresses and associated IP addresses when another aggregation switch experiences increased demand.

Controller 302 may have access to all data transmitted through the network using interface 316. For example, the controller 302 may be included within core switch 106 and therefore have visibility into data transmissions because it will be transmitting packets within, from, and to the network. As a result, controller 302 may maintain a complete network topology, including, for example, a list of devices, which access switches the devices use, and the responsible aggregation switches. There are many ways for controller 302 to maintain and update the active network topology. For example, one protocol for discovering and maintaining the active network topology is the locator/ID separate protocol (LISP). Other protocols are also available to allow the controller to follow traffic and maintain an accurate view of the network topology.

In another exemplary embodiment, aggregation switches may notify the controller periodically, such as every minute, of any new devices that have connected to the network. The aggregation switches may also notify the controller when a new device connects to the network. Accordingly, the controller may automatically learn and update the network topology, the switches may notify the controller of any network changes, or any combination of the two. The controller may store the size of aggregation switches and keep track of the number of stored entries to determine when an aggregation switch approaches its capacity.

When a new device connects to an access switch, the controller may examine the aggregation switches to determine the most appropriate aggregation switch to handle communications for the new device. In the example of FIG. 1, device 100*c* may come online in a particular floor of a building, and aggregation switch 104*a* may be assigned to handle communications for device 100*c* since it may be responsible for communications on that floor. Controller 302 may also determine whether memory load sharing should be used because the assigned aggregation switch exceeds its capacity. In addition, memory load sharing for addressing information may be based on factors other than the usage of an aggregation switch. For example, the network may be configured to automatically shut down a certain number or percentage of aggregation switches at defined times. Network usage in the evening may be low, so power can be conserved by shutting down aggregation switches, and other network equipment, and then using memory sharing techniques to maintain network availability.

When controller 302 determines that network resource sharing for routing and forwarding information should be used, controller 302 may identify an appropriate aggregation switch for storing the associated IP addresses and establish tunnel 110. In addition, aggregation switches may have a tunnel to the controller 302 as well. In one exemplary embodiment, controller 302 may manage the routing and forwarding profiles on the aggregation switches.

Controller 302 may include one or more hardware components such as, a central processing unit (CPU) or microprocessor 306, a random access memory (RAM) module 308, a read-only memory (ROM) module 310, a memory or data storage module 312, a database 314, an interface 316, and one or more input/output (I/O) devices 318. Alternatively and/or additionally, controller 302 may include one or more software media components such as, for example, a computer-readable medium including computer-executable instructions for performing methods consistent with certain disclosed embodiments. It is contemplated that one or more of the hardware components listed above may be implemented using software. For example, storage 312 may include a software partition associated with one or more other hardware components.

CPU 306 may include one or more processors, each configured to execute instructions and process data to perform one or more functions. CPU 306 may be communicatively coupled to RAM 308, ROM 310, storage 312, database 314, interface 316, and I/O devices 318. CPU 306 may be configured to execute sequences of computer program instructions to perform various processes, which will be described in detail below. The computer program instructions may be loaded into RAM 308 for execution by CPU 306.

RAM 308 and ROM 310 may each include one or more devices for storing information associated with device operation. For example, ROM 310 may include a memory device configured to storing routing and forwarding information. RAM 308 may include a memory device for storing data associated with one or more operations of CPU 306 or interface 316. For example, ROM 310 may load instructions into RAM 308 for execution by CPU 306.

Storage 312 may include any type storage device configured to store information that CPU 306 may need to perform processes consistent with the disclosed embodiments. For example, storage 312 may include one or more magnetic and/or optical disk devices, such as hard drives, CD-ROMs, DVD-ROMs, or any other type of mass media device. Alternatively or additionally, storage 312 may include flash memory mass media storage or other semiconductor-based storage medium. In one example, storage 312 may be ternary content-addressable memory (TCAM) to store routing and forwarding information including MAC and IP addresses.

Database 314 may include one or more software and/or hardware components that cooperate to store, organize, sort, filter, and/or arrange data. CPU 306 may access the information stored in database 314 to maintain and determine the network topology. Database 314 may store additional and/or different information than that listed above.

Interface 316 may include one or more components configured to transmit and receive data via a communication network 320, which may be the Internet, a local area network, a workstation peer-to-peer network, a direct link network, a wireless network, or any other suitable communication platform. For example, interface 316 may include one or more modulators, demodulators, multiplexers, demultiplexers, network communication devices, wireless devices, antennas, modems, and any other type of device configured to enable data communication via a communication network. According to one embodiment, interface 316 may be coupled to or include wireless communication devices, such as a module or modules configured to transmit information wirelessly using Wi-Fi or Bluetooth wireless protocols.

I/O devices 318 may include one or more components configured to communicate information with a component or user associated. I/O devices 318 may include a console with an integrated keyboard and mouse to allow user input. I/O devices 318 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device. For example, an I/O device 318 may include a user interface for a network administrator to configure and maintain the network.

Figure 4:
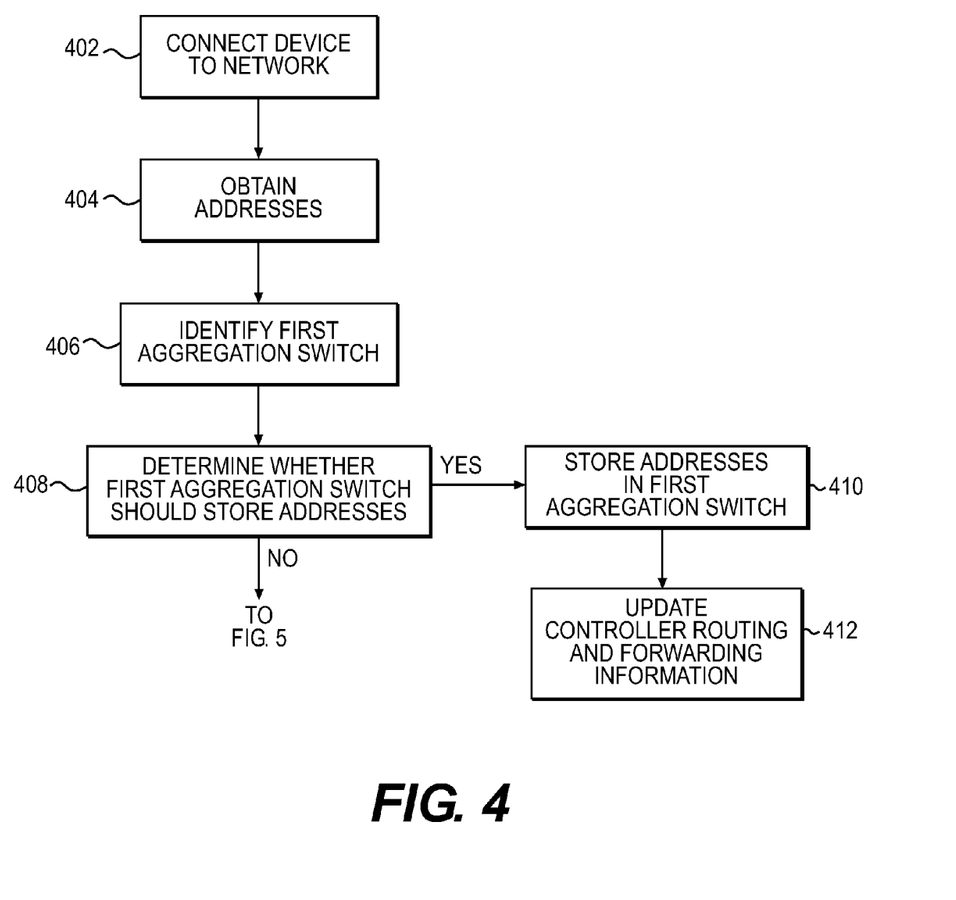
FIG. 4 illustrates a flowchart of an exemplary method for storing routing and forwarding information.
Figure 5:
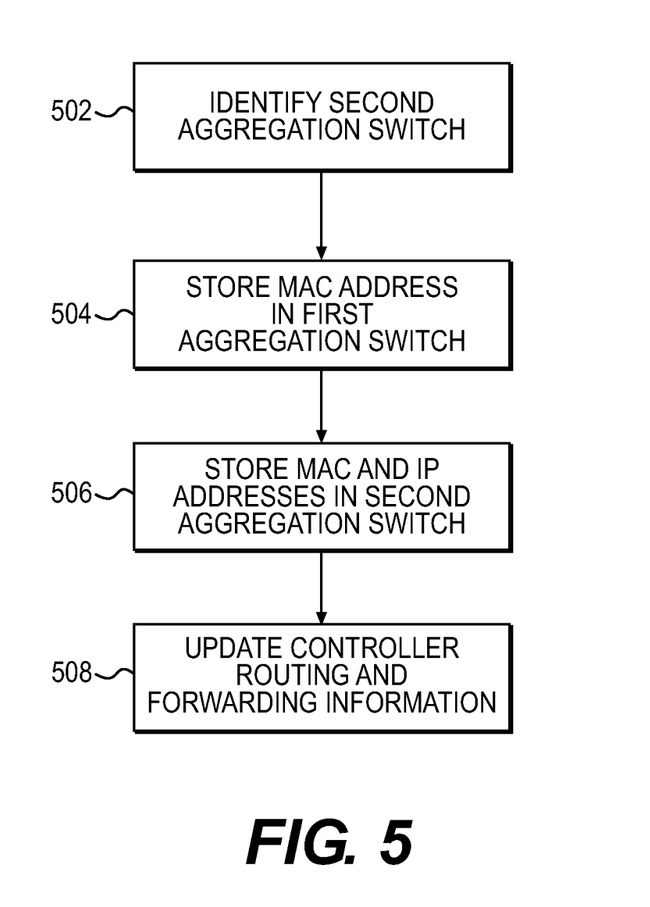
FIG. 5 illustrates a second flowchart of an exemplary method for storing routing and forwarding information.

FIGS. 4 and 5 illustrate an exemplary method for sharing network resources relating to routing and forwarding information. The method of FIGS. 4 and 5 may be executed when a device joins the network, as a device roams throughout a network, periodically, on demand as requested by a network administrator, when a network is reconfigured by adding or removing switches, or in other circumstances.

At step 402, a device may be connected to the network through an access switch. The access switch through which the device connects may obtain the MAC address for the device. In addition, one or more IP addresses may be obtained, for example, using a DHCP server at step 404. The aggregation switch through which the device connects may view the packets used to transmit data or to assign the IP address and store the new device's MAC address and IP address in memory. Other techniques for discovering new devices and storing their associated MAC and IP addresses in memory may also be used by aggregation switches.

The device may have already been assigned one or more IP addresses when the device is mobile throughout the network. For example, a user may roam through a corporate network and their device may switch to new access switches for wireless connections that are closer. The new access switches may be served by new aggregation switches, but the devices may desire to retain their existing IP addresses. In this example, obtaining new IP addresses may be unnecessary. The controller may determine that the user has moved within the network by reading data packets travelling through the controller. In this way, the controller maintains an accurate network topology including the location of network components.

At step 406, the controller may identify a first aggregation switch through which the device initially connects, also referred to as a first-hop default switch. The first aggregation switch may store a forwarding entry including the level two (e.g., MAC) and level three (e.g., IP) addresses. The controller may maintain a forwarding profile for the aggregation switches in the network along with the currently used resources for the aggregation switches. The aggregation switch may automatically notify the controller of new forwarding entries, the controller may periodically request a list of entries from the aggregation switches, or other techniques such as LISP may be used so that the controller maintains an accurate network topology and indication of resources being used.

The aggregation switches may include information in addition to the MAC and IP addresses previously described. For example, the aggregation switches may maintain an indication of its table sizes, amount of memory, a feature matrix for supported features, whether the switch supports offloading memory and tunneling, and whether the aggregation switch is a stub switch that does not have down links or level two links to access switches. Stub switches may be powered off by the controller when not hosting remote devices that are serviced by different aggregation switches.

At step 408, the controller may determine whether the first aggregation switch should store the routing and forwarding information, including the MAC and IP addresses. The process by which controller determines whether the first aggregation switch should store the routing and forwarding information may be automated or manually selected by a network administrator. For example, if the controller determines that the first aggregation switch is already operating at or above a predefined capacity, such as eighty percent, then it may determine that one or more additional aggregation switches should be used. In one exemplary embodiment, the predefined capacity may be selected by a network administrator, and different predefined capacities may be employed for different aggregation switches.

As another example, the controller may select an aggregation switch based on its geographic diversity. An aggregation switch located further away from an aggregation switch experiencing high volume, such as one in a busy conference room, may have additional resources. In addition, the controller may determine the type of device and whether the device may be better served by another aggregation switch. Some devices may require support for IPv6 and multiple IP addresses per MAC address. The controller may determine that a different aggregation switch may better serve devices requiring IPv6 support than the first aggregation switch. Similarly, the controller may determine that a device requiring both IPv4 and IPv6 support may be better served by storing IPv4 addresses on the first aggregation switch and using a separate aggregation switch for IPv6 addresses. The controller may also seek to route traffic of a give type and application through specific aggregation switches.

The controller may also evaluate whether the first aggregation switch has appropriate forwarding capacities and capabilities. Some aggregation switches may support various bandwidths for packet traffic. The controller may monitor bandwidth usage and scale up to use a cluster of aggregation switches when additional bandwidth is needed because, for example, the first aggregation switch may be acting as a bottleneck under high network load. In addition, the controller may provide additional features to a device by determining that the first aggregation switch does not support a feature and selecting an additional aggregation switch that does. While a number of examples of determining whether the first aggregation switch should store the routing and forwarding information have been provided, it will be appreciated that additional considerations may be made consistent with the disclosure. For example, a network administrator may program the controller with various use cases to determine when to use a particular aggregation switch or implement network resource sharing for storing routing and forwarding information.

When the controller determines that the first aggregation switch should be used, the MAC and IP addresses may be stored in the first aggregation switch at step 410. In addition, the controller's routing and forwarding information, including the MAC and IP addresses, may be updated at step 412 to reflect the appropriate routing to a device through the first aggregation switch. In one exemplary embodiment, steps 410 and 412 may, in one embodiment, have already been performed at step 404 when the addresses were initially obtained.

If, however, the controller determines that network resource sharing for the routing and forwarding information should be used, the method may continue as shown in FIG. 5. In this example, the controller may store the MAC address in the first aggregation switch, and move the MAC and IP addresses to one or more additional aggregation switches to balance the load of storing routing and forwarding information throughout the network. The controller may make this determination, for example, when a device initially joins a network, when a device moves to a new location in a network, when a device acquires additional level three addresses through a DHCP server, or at other times.

At step 502, the controller may identify a second aggregation switch to store the routing and forwarding information. Alternatively, a plurality of additional aggregation switches may be identified. The second aggregation switch may be selected based on factors similar to those previously discussed with reference to step 406. For example, where a first aggregation switch is already operating at or above a predefined capacity, a second aggregation switch that is operating well below the predefined capacity, for example, at less than fifty percent, may be selected. The second aggregation switch may also be geographically close to the first aggregation switch, able to handle the particular features selected by a device, capable of supporting a particular addressing scheme, such as IPv6, have additional unused bandwidth, or may support a given type of device or traffic requested by a device. One or more of these, and other, factors may be evaluated by the controller to select an appropriate second aggregation switch.

At step 504, the MAC address for the device may be stored in the first aggregation switch. Where the MAC address and associated IP address have previously been stored by the first aggregation switch, the IP addresses may be removed to free up additional memory. In one exemplary embodiment, the first aggregation switch may store the MAC address for a device and fewer than all of the IP addresses for the device. For example, the first aggregation switch may store a MAC address and an IPv4 address while additional IPv6 addresses may be stored on the second aggregation switch, as described below.

The first aggregation switch may also store an indication that IP addresses are stored on a second aggregation switch. In one exemplary embodiment, a policy pointer may point to a tunnel 110 that will be used to forward the packet to the second aggregation switch where it can be further routed using the IP addresses. In one exemplary embodiment, the tunnel 110 may therefore operate based on the MAC address Next, the MAC and additional IP addresses may be stored in the second aggregation switch at step 506. An example of this is shown in FIG. 2 with aggregation switch 104b at entries 210b-e. The second aggregation switch may also store an indication that packets destined for additional IP addresses may use tunnel 110 and MAC address forwarding as previously described. In one exemplary embodiment, a level two source address lookup may point to a level three adjacency, and a policy pointer may indicate that the traffic for the IP addresses will be forwarded using the tunnel instead of using normal destination-based forwarding. The adjacency may point to one of the tunnels that will result in the packet being forwarded to the appropriate first aggregation switch. The policy pointer may be, for example, an access control list that may be used to filter network traffic based on a protocol type, such as IPv4 or IPv6 addressing.

Accordingly, the second aggregation switch may perform a level-two MAC address lookup for incoming packets. The result of the level-two lookup may include, for example, redirection, dropping the packet, or no change to the original adjacency selection based on the destination. Packets may be redirected where the tunnel will be used because the second aggregation switch stores IP addresses for devices served by another aggregation switch. Packets may be dropped, for example, where a user has exceeded the threshold for a number of addresses assigned to a single device. For devices downstream of the second aggregation switch that have not used any resource sharing, the second aggregation switch may not have any change to the original adjacency and it may forward packets using the MAC address to the appropriate access switch.

At step 508, the routing and forwarding information in the controller may be updated. The controller may program the level three addresses, such as IP addresses, of the device into, for example, the core switch 106 along with IP routing and forwarding information to the second aggregation switch that stores the IP addresses. As a result, traffic entering the network through the core switch may be sent to the second aggregation switch for those IP addresses of a device that are stored in the second aggregation switch. The second aggregation switch may then use the tunnel to forward packets to the first aggregation switch. The second aggregation switch may look up in its routing and forwarding information table the MAC address for the device based on the destination IP address in the packet. It may then encapsulate the packet, placing the packet with the MAC address of the device within a packet with the MAC address of the first aggregation switch. In this way, the packet may be sent through a tunnel to the first aggregation switch. The first aggregation switch may receive the encapsulated packet, remove the outer packet with its own MAC address, and forward the packet on to the device based on the device MAC address.

As mentioned previously, the first aggregation switch may store some IP addresses and additional IP addresses may be moved to other aggregation switches. In one example, the first aggregation switch stores an IPv4 address, and a second aggregation switch stores IPv6 addresses associated with the same MAC address. The core switch may store routing information for the IPv4 addresses and route packets to the IPv4 addresses directly to the first aggregation switch. The core switch may store routing and forwarding information for the IPv6 addresses so that the packets are routed to a second aggregation switch to be forwarded on to the first aggregation switch using a tunnel and MAC address as previously described. In one exemplary embodiment, the core switch need not know every IP address under each aggregation switch. Instead, the core switch may know the groups and pools of IP addresses so that the appropriate aggregation switches may be selected for routing and forwarding packets.

Packets or frames sent to the device using any of the device's addresses may therefore be directed to the second switch, which may redirect the frames to the first switch using the first address. A controller may select the second switch to distribute the addresses based on a variety of criteria, such as a hardware resource usage profile, in the first and second switches.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The invention claimed is:

1. An apparatus comprising:
   a processor;
   a forwarding or routing table;
   a memory having instructions stored thereon, wherein the instructions when executed by the processor, cause the processor to:
   upon receiving a first MAC address (media access protocol) and a first IP (internet protocol) address associated with a device for entry to the forwarding or routing table, store the first MAC address and the first IP address in the forwarding or routing table; and
   upon receiving the first MAC address and one or more second IP addresses associated with the device for entry to the forwarding or routing table, forward, via a tunnel maintained with a second apparatus, the one or more second IP addresses to the second apparatus, wherein the forwarded one or more second IP addresses are entered in a second forwarding or routing table associated with the second apparatus;
   wherein, thereafter, routing or forwarding to, or from, the device in connection with the first MAC address is performed by the apparatus,
   wherein, thereafter, routing or forwarding to, or from, the device in connection with the first IP address is performed by the apparatus, and
   wherein, thereafter, routing or forwarding to, or from, the device in connection with the second one or more IP addresses is performed using the second apparatus and across the tunnel.

2. The apparatus of claim 1, wherein the instructions when executed by the processor, cause the processor to establish the tunnel with the second apparatus.

3. The apparatus of claim 1, wherein, upon receiving, from the tunnel, an encapsulated packet having a payload packet having a destination address associated with the first MAC address the apparatus is configured to decapsulate the received encapsulated packet and to forward the decapsulated payload packet to the device.

4. The apparatus of claim 1, wherein the instructions when executed by the processor, cause the processor to:
   upon receiving a third MAC address and one or more third IP addresses associated with a second device for entry to the forwarding or routing table, forward, via a second tunnel maintained with a third apparatus, the one or more third IP addresses to a third forwarding or routing table, wherein the forwarded one or more third IP addresses are entered in the third forwarding or routing table associated with the third apparatus, and wherein forwarding of the one or more third IP addresses is based on an evaluation at the apparatus or a remote controller of a criteria selected from the group consisting of:
   an amount of available memory associated with the apparatus exceeding a pre-defined memory threshold;
   an amount of used bandwidth associated with the apparatus exceeding a pre-defined bandwidth threshold; and
   the one or more IP addresses corresponding to a type of address corresponding to IPv4 or IPv6.

5. The method of claim 1, wherein each of the apparatus and the second apparatus comprises a switch or a router.

6. The apparatus of claim 1, wherein the tunnel comprises an L2 (Layer-2) overlay tunnel.

7. The apparatus of claim 1, wherein the forwarding or routing table comprises ternary content-addressable memory (TCAM).

8. A system comprising:
a first switch configured to, i) upon receiving a first MAC address and a first IP address associated with a device for entry to a first forwarding or routing table associated with the first switch, store the first MAC address and first IP address in the first forwarding or routing table associated with the first switch and ii) upon receiving the first MAC address and a second IP address associated with the device for entry to the first forwarding or routing table associated with the first switch, forward, via a tunnel maintained with a second switch, the second IP address to the second switch; and
the second switch, wherein the second switch is configured to store the second IP address associated with the device;
wherein, thereafter, routing or forwarding to, or from, the device in connection with the first MAC address is performed by the first switch,
wherein, thereafter, routing or forwarding to, or from, the device in connection with the first IP address is performed by the first switch, and
wherein, thereafter, routing or forwarding to, or from, the device in connection with the second IP address is performed by the second switch and across the tunnel.

9. The system of claim 8, further comprising a controller configured to monitor routing or forwarding resources of the first switch, wherein the first switch is configured to forward, upon a command from the controller, the second IP address to store at the second forwarding or routing table associated with the second switch.

10. The system of claim 8, wherein the second switch is configured, upon receiving a packet having a destination address corresponding to the first MAC address, to encapsulate the received packet as an encapsulated packet and to forward the encapsulated packet to the first switch, wherein the first switch is configured to decapsulate the encapsulated packet received thereat and forward the received packet to the device.

11. The system of claim 8, wherein the tunnel comprises an L2 (Layer-2) overlay tunnel.

12. The system of claim 8, wherein the first forwarding or routing table associated with the first switch and the second forwarding or routing table associated with the second switch comprise the same configuration for both IPv4 and IPv6 operation.

13. The system of claim 8, wherein the first forwarding or routing table associated with the first switch comprises a first configuration for IPv4 and IPv6 operation, wherein the second forwarding or routing table associated with the second switch comprises a second configuration for IPv4 and IPv6 configuration, and wherein the first configuration and the second configuration are different.

14. An apparatus comprising
a processor;
a forwarding or routing table;
a memory having instructions stored thereon, wherein the instructions when executed by the processor, cause the processor to:
receive, from a second apparatus, via a tunnel maintained with the second apparatus, an IP address to store as an entry in the forwarding or routing table, wherein the IP address is associated with a device and was sent from the device to the second apparatus for entry to the forwarding or routing table associated with the second apparatus; and
store the IP address in the forwarding or routing table
wherein, thereafter, associated routing or forwarding to, or from, the device in connection with the IP address is performed using forwarding or routing table and across the tunnel.

15. The apparatus of claim 14, wherein the instructions, when executed by the processor, cause the processor to establish the tunnel between the apparatus and the second apparatus.

16. The apparatus of claim 14,
wherein the apparatus is configured, upon receiving a packet comprising a destination address corresponding to the MAC address and IP address of the device, to encapsulate the received packet in an encapsulated packet and to forward the encapsulated packet to the second apparatus, wherein the second apparatus is configured to decapsulate the encapsulated packet and to forward the received packet to the device.

17. The apparatus of claim 14, wherein each of the apparatus and the second apparatus comprises a switch or a router.

18. The apparatus of claim 14, wherein the tunnel comprises an L2 (Layer-2) overlay tunnel.

19. The apparatus of claim 14, wherein the forwarding or routing table comprises ternary content-addressable memory (TCAM).

20. The apparatus of claim 14, wherein, upon receiving, from the tunnel, an encapsulated packet having a payload packet comprising an external network destination address, the apparatus is configured to decapsulate the received encapsulated packet and to forward the decapsulated payload packet to a network device corresponding to the external network destination address.

* * * * *